United States Patent
Nies (10) Patent No.: US 8,154,142 B2
(45) Date of Patent: Apr. 10, 2012

(54) COMMUNICATING ENERGY STORAGES WITH DIFFERENT FUNCTIONS

(75) Inventor: Jacob J. Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 504 days.

(21) Appl. No.: 12/512,110

(22) Filed: Jul. 30, 2009

(65) Prior Publication Data

US 2011/0025058 A1    Feb. 3, 2011

(51) Int. Cl.
*H02P 9/00* (2006.01)
*F03D 9/00* (2006.01)

(52) U.S. Cl. .......................................... 290/44; 290/54
(58) Field of Classification Search ............... 290/1 R, 290/43, 44, 54, 55; 416/223
See application file for complete search history.

(56) References Cited

U.S. PATENT DOCUMENTS

| | | | |
|---|---|---|---|
| 4,753,078 A * | 6/1988 | Gardner, Jr. ............... | 60/668 |
| 5,289,041 A * | 2/1994 | Holley ....................... | 290/44 |
| 6,670,721 B2 | 12/2003 | Lof et al. | |
| 6,800,956 B2 * | 10/2004 | Bartlett ...................... | 290/55 |
| 6,921,985 B2 | 7/2005 | Janssen et al. | |
| 7,233,129 B2 | 6/2007 | Erdman et al. | |
| 7,298,056 B2 * | 11/2007 | Gizara ....................... | 290/54 |
| 2006/0087124 A1 | 4/2006 | Stahlkopf | |
| 2006/0132994 A1 | 6/2006 | Delmerico et al. | |
| 2007/0057516 A1 | 3/2007 | Mever et al. | |
| 2007/0187955 A1 | 8/2007 | Erdman et al. | |

* cited by examiner

*Primary Examiner* — Nicholas Ponomarenko
(74) *Attorney, Agent, or Firm* — Ernest G. Cusick; Frank A. Landgraff (57) ABSTRACT

An integrated system of communicating energy storage devices for supplying an alternate power source to operating systems for a wind turbine connected to an electrical grid, is provided. The integrated system includes at least one wind turbine with a rotor, the wind turbine being connected to an electrical grid. At least one operating system of the at least one wind turbine requires an alternate power source during a wind turbine operating condition. Further included are a plurality of energy storage devices capable of supplying the alternate power source. Communication of energy storage between at least two of energy storage devices is provided.

18 Claims, 8 Drawing Sheets

COMMUNICATING ENERGY STORAGES WITH DIFFERENT FUNCTIONS

BACKGROUND OF THE INVENTION

The invention relates generally to energy storage systems in wind turbine and windfarm systems and more specifically to energy storage systems which communicate to provide for operation of wind turbines, particularly during operating conditions for which alternate power must be supplied to the wind turbine.

Wind turbines are regarded as environmentally friendly and relatively inexpensive alternative sources of energy that utilize wind energy to produce electrical power. A wind turbine generator generally includes a wind rotor having a plurality of blades that transform wind energy into rotational motion of a drive shaft, which in turn is utilized to drive a rotor of an electrical generator to produce electrical power. Modern wind power generation systems typically take the form of a wind farm having multiple such wind turbine generators that are operable to supply power to a transmission system providing power to a utility grid. Output from the wind turbine generators is typically combined for transmission to the grid.

Wind is an intermittent resource and power supplied by the wind farm to utilities is significantly influenced by changes in wind conditions. Generally, power output of a wind turbine power station increases with wind speed, until the wind speed reaches the rated wind speed for the turbine. With further increases in wind speed, the turbine operates at rated power up to a cut off value or a trip level. This is generally the wind speed at which dynamic loads on the wind turbine cause the mechanical components of the turbine to reach a fatigue limit. As a protective function, at wind speeds higher than a certain speed, wind turbines are often required to shut down, or reduce loads by regulating the pitch of the blades or braking the rotor, thereby leading to a reduced power output of the wind turbine generator, and consequently of the wind farm. However, electrical loads on utilities need to be balanced at all times by power generation units. Hence, utility systems usually have additional power generation resources available, such as thermal generators that can accommodate this variability in wind conditions.

Figure 1:
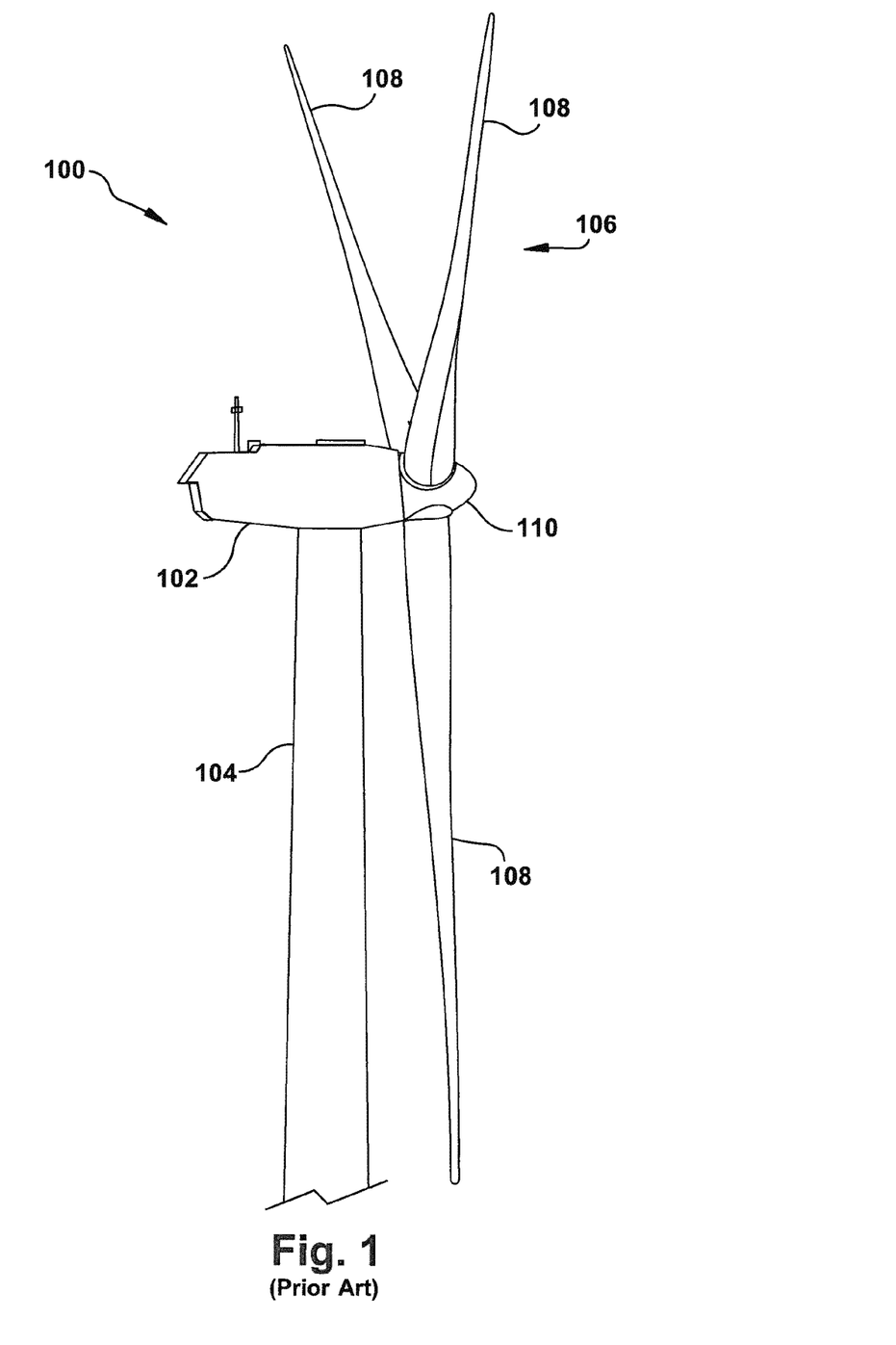
FIG. 1 illustrates an exemplary configuration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
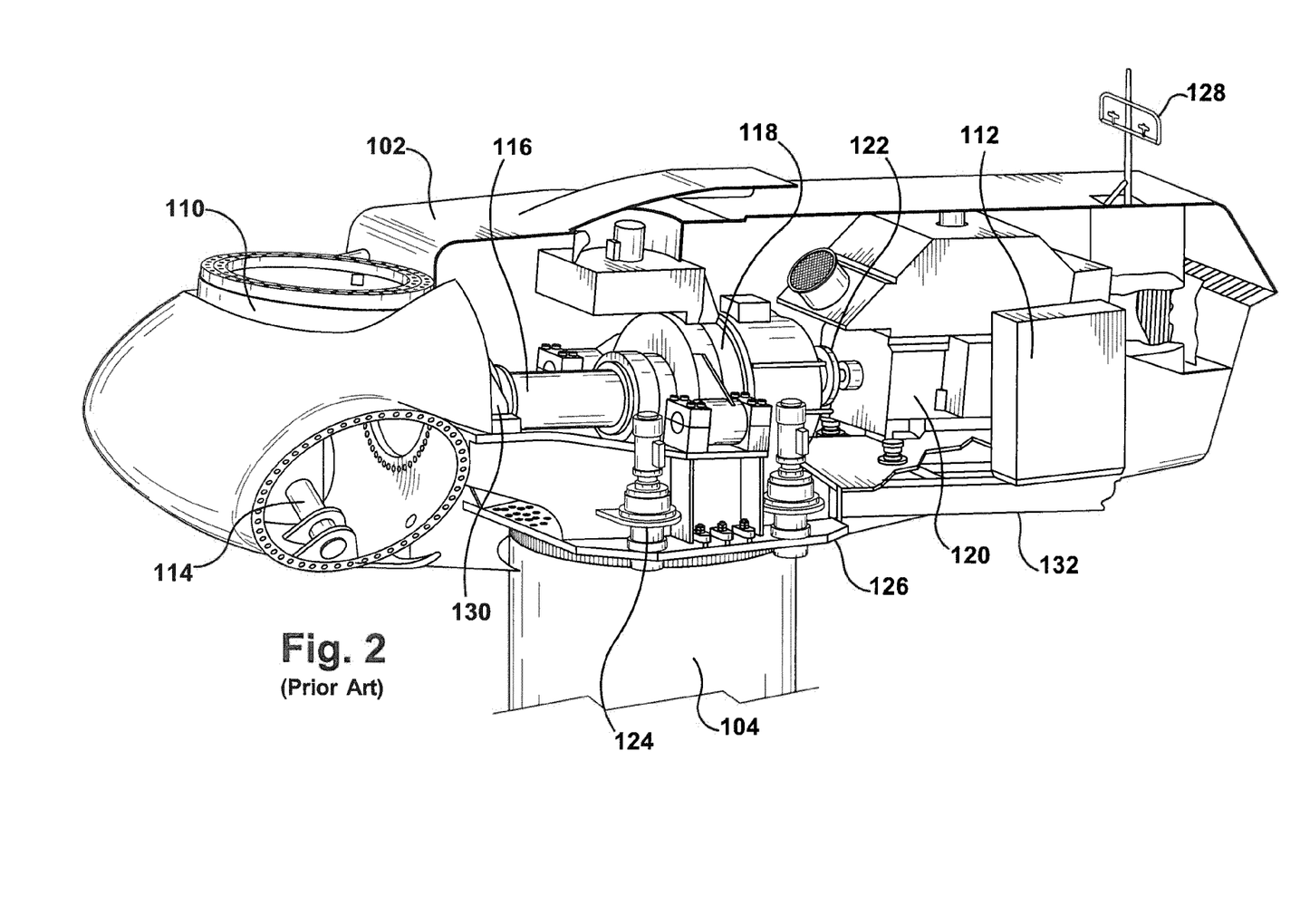
FIG. 2 illustrates a cut-away perspective view of a nacelle of the exemplary wind turbine configuration shown in FIG. 1.

Referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system are used for overall system monitoring and control including pitch and speed regulation, high-speed shaft and yaw brake application, yaw and pump motor application and fault monitoring. Alternative distributed or centralized control architectures are used in some configurations.

In some configurations, the control system provides control signals to a variable blade pitch drive 114 to control the pitch of blades 108 (not shown in FIG. 2) that drive hub 110 as a result of wind. In the illustrated configuration, hub 110 receives three blades 108, but other configurations can utilize any number of blades. In some configurations, the pitches of blades 108 are individually controlled by blade pitch drive 114. Hub 110 and blades 108 together comprise wind turbine rotor 106.

The drive train of the wind turbine may include a main rotor shaft 116 (also referred to as a "low speed shaft") connected to hub 110 and supported by a main bearing 130 and, at an opposite end of shaft 116, to a gear box 118. Gear box 118, in some configurations, utilizes a dual path geometry to drive an enclosed high-speed shaft. The high-speed shaft (not shown in FIG. 2) is used to drive generator 120, which is mounted on main frame 132. In some configurations, rotor torque is transmitted via coupling 122. Generator 120 may be of any suitable type, for example, a wound rotor induction generator.

Yaw drive 124 and yaw deck 126 provide a yaw orientation system for wind turbine 100. Wind vane 128 provides information for the yaw orientation system, including measured instantaneous wind direction and wind speed at the wind turbine. In some configurations, the yaw system is mounted on a flange provided atop tower 104.

Figure 3:
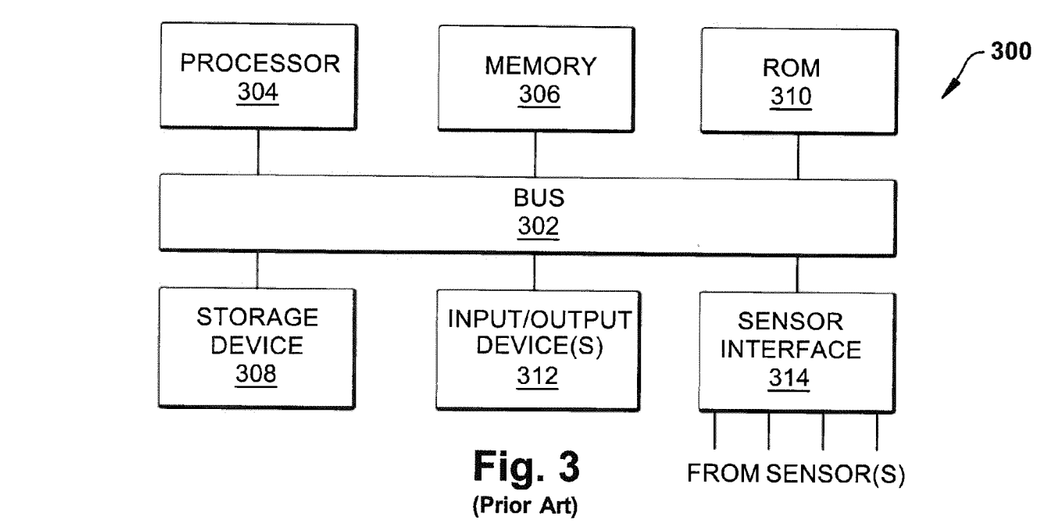
FIG. 3 is a block diagram of an exemplary configuration of a prior art control system for the wind turbine configuration shown in FIG. 1.

In some configurations and referring to FIG. 3, a control system 300 for wind turbine 100 may include a bus 302 or other communications device to communicate information. Processor(s) 304 may be coupled to bus 302 to process information, including information from sensors configured to measure displacements or moments. Control system 300 may further include random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304.

Figure 4:
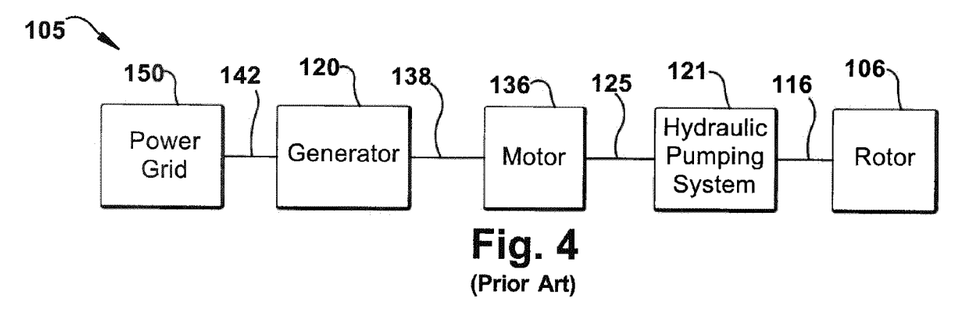
FIG. 4 illustrates a prior art wind turbine system that includes a hub, a shaft coupled to the hub and a hydraulic pump disposed proximate to the shaft and configured to provide a pressurized fluid to a motor.

FIG. 4 illustrates a prior art wind turbine system that includes a hub, a shaft coupled to the hub and a hydraulic pump disposed proximate to the shaft and configured to provide a pressurized fluid to a motor. In some configurations, the wind turbine power generation system 105 housed in nacelle 102 (FIG. 1) may be arranged as illustrated in FIG. 4. Here, a rotor 106 is coupled by a shaft 116 to a hydraulic pumping system 121. This hydraulic pumping system 121 is disclosed in U.S. patent application Ser. No. 12/409,909, filed Mar. 24, 2009, and is further disclosed in U.S. patent application Ser. No. 12/265,824, filed Nov. 6, 2008. Rotor 106 rotationally drives shaft 112 to provide mechanical energy to hydraulic pumping system 121 to circulate high pressure hydraulic fluid within the hydraulic pumping system 121. The hydraulic pumping system 121 is coupled to a motor 136 via a hydraulic fluid circulation system 125. The motor 136 converts energy from the circulating high pressure fluid into mechanical energy. The motor 136 may be any hydraulic motor suitable for this purpose that is known in the art. The motor 136 may be coupled by a transfer device 138 to a generator 120. The hydraulic pumping system 121, the motor 136 and the generator 120 may include sensors (not shown) for providing motor operational data to the power generation system 105. The transfer device 138 may be a shaft. The generator 120 converts the mechanical energy into electricity. The generator 120 provides the generated electricity to a power grid 150 via a transmission line 142. In another arrangements, the motor 136 and generator 120 may be combined in a single device.

Utility grid abnormalities may result in conditions for which the wind turbine may no longer supply power to the grid. Yet under these conditions a strong windforce may continue to drive the wind turbine to produce power. Unless the produced power is transmitted from the rotor, after a time, the wind turbine must be shut down. Further, during other wind turbine operating conditions, such as grid transients, loss of power to wind turbine operating systems or maintenance conditions, the wind turbine may either need to be supplied power for its operating systems or transfer excess power. Consequently it would be desirable to provide a variety of energy storage functions that could store energy in suitable form to subsequently deliver the energy to wind turbine operating systems that require alternate power sources under various wind turbine operating conditions, or to absorb excess energy from the wind turbine that cannot be supplied to the grid. In wind turbines, several energy storage systems may be incorporated. Some very common examples include batteries for pitch systems or for wind turbine controls or hydraulic accumulators for (secondary) brake systems. These storage systems may often stand alone. Accordingly, it may be desirable to have communicating accumulation systems and conversion systems between them.

BRIEF DESCRIPTION OF THE INVENTION

The present invention relates to storage of energy related to wind turbine systems and communication and control of the systems for maintaining continuity of wind turbine operation.

Briefly in accordance with one aspect of the present invention, an integrated system of communicating energy storage devices is provided for supplying an alternate power source to operating systems for a wind turbine connected to an electrical grid. The integrated system includes at least one wind turbine with a rotor, the wind turbine being connected to an electrical grid. At least one operating system of the at least one wind turbine requires an alternate power source during a wind turbine operating condition. Further included are a plurality of energy storage devices capable of supplying the alternate power source. Communication of energy storage between at least two of the plurality of energy storage devices is provided.

In accordance with a second aspect of the present invention, an integrated system of communicating energy storage devices for supplying and controlling an alternate power source to operating systems for a wind turbine connected to an electrical grid, is provided. The integrated system includes at least one wind turbine, with a rotor, connected to an electrical grid. At least one operating system of the at least one wind turbine requires an alternate power source during a wind turbine operating condition. Further included are a plurality of energy storage devices capable of supplying the alternate power source. Communication of energy storage between at least two of the plurality of energy storage devices is provided. A control device controls the transfer of energy between the energy storage devices and at least one wind turbine operating system.

In accordance with a third aspect of the present invention, a method for operating an integrated system of communicating energy storage devices for supplying an alternate power source to operating systems for a wind turbine connected to an electrical grid is provided. The integrated system includes at least one wind turbine connected to an electrical grid; at least one operating system of the at least one wind turbine requiring an alternate power source during a wind turbine operating condition; a plurality of energy storage devices capable of supplying the alternate power source; communication of energy storage between at least two of the plurality of energy storage devices; and a control device for controlling the transfer of energy between the energy storage devices and at least one wind turbine system.

The method includes supplying the energy storage devices with at least one of a rotor of the wind turbine, the electric grid, an auxiliary wind turbine attached; a hydroelectric generator; solar panels, and geothermal electric generation. System sensors sense a wind turbine operating condition. The control device determines the wind turbine operating condition, utilizing inputs from the sensors. The control device further determines the need for transfer of stored energy between a stored energy device and a wind turbine operating system for the determined wind turbine operating condition. The control device then selects which of the plurality of energy storage devices may provide for the transfer of energy to the wind turbine operating system for the wind turbine operating condition. The control device then initiates a transfer of stored energy between a stored energy device and a wind turbine operating system for the wind turbine operating condition.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including providing communication between a plurality of energy storage devices, and the controlling the accumulation of energy within a given energy storage device and controlling the transfer of energy between the energy storage devices, thereby enhancing continuity of operation for a wind turbine and providing safe for continuity of shutdown and maintenance when normal power is not available.

An accumulator, as referred to herein, is an energy storage device. Traditionally in the context of electro-mechanical systems, like a wind turbine, the accumulator that is thought of is a hydraulic accumulator. The hydraulic accumulator may be a pressure storage reservoir in which a non-compressible fluid is held under pressure by an external source, which for example may be a spring a raised weight or compressed gas (hydro-pneumatic). However in the broader context of useful energy storage applications, the term accumulator may be applied to any energy storage device.

Examples may include a hydraulic accumulator that buffers short term pressure pulses due to pumps or motor delivery irregularities Accumulators may be electrical, including inductors, capacitors and superconducting coils. Accumulators may be mechanical, incorporating spring or altitude potential. Chemical accumulators may incorporate hydrogen storage or batteries. The hydraulic accumulators previously described include pneumatic types with air or gas filled accumulators and hydraulic ones.

Figure 5:
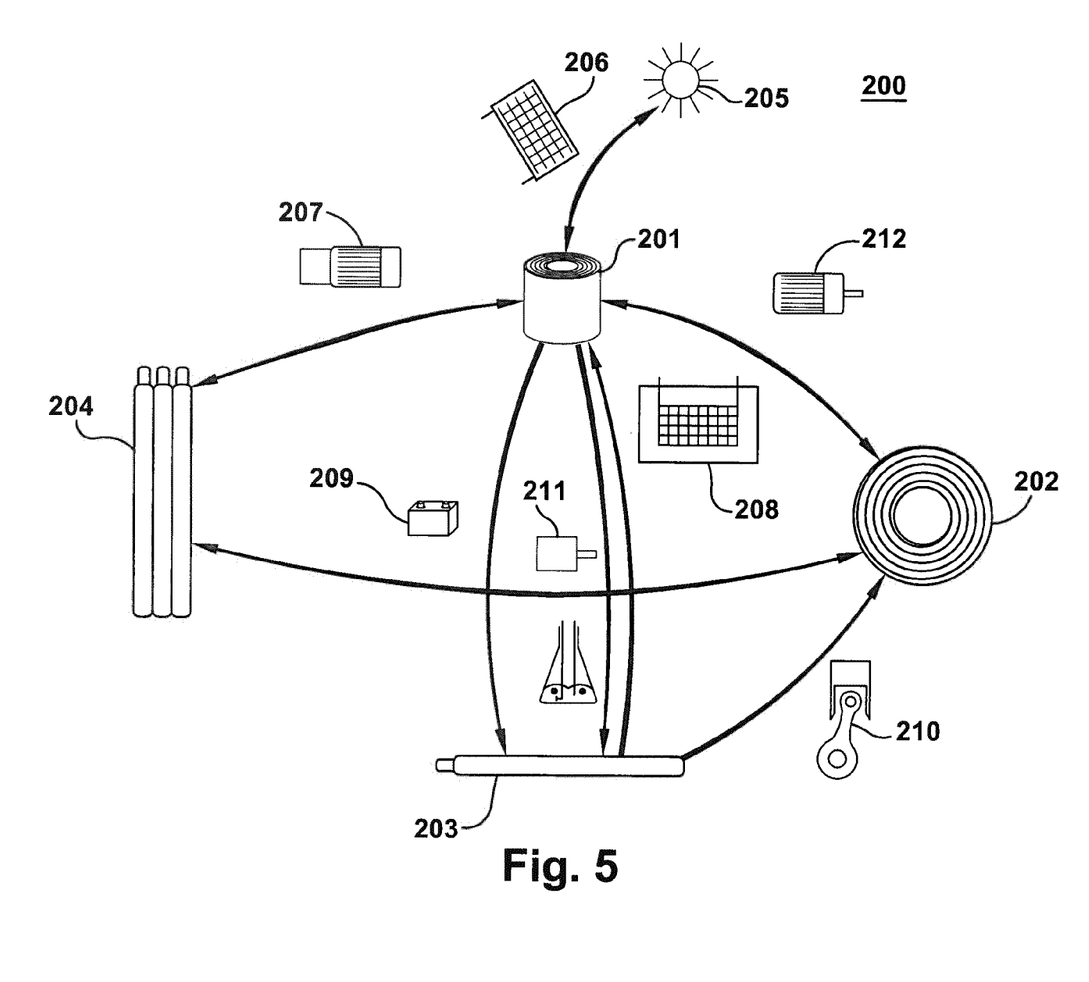
FIG. 5 illustrates a variety of accumulators that may provide communicating energy storage capacity useful to wind turbine operating systems.

Stored energy in the accumulators may be converted or transformed from one type to another. This is referred to as communication between the energy storage systems. FIG. 5 illustrates a system of accumulators 200 that may provide communicating energy storage capacity useful to wind turbine operating systems. Capacitor 201 represents forms of electrical energy storage in accumulators. Spring 202 represents forms of mechanical energy storage in accumulators. Vessel 203 represents hydrogen or chemical energy storage. Cylinders 204 represent pneumatic or hydraulic energy storage. Solar power 205 may be transformed through solar panels 206.

Energy may be reciprocally converted by energy transfer devices, as represented in the following examples. Solar power 205 may be transferred through photovoltaic cells 206 into electric energy. Electric energy and pneumatic/hydraulic energy may be reciprocally converted through an electric motor/hydraulic motors, pumps or compressors 207. Fuel cells 208 may be reciprocally convert between electric energy and chemical energy. A battery system 209 may convert between electric energy and chemical energy. Chemical energy may be converted to mechanical energy through a combustion motor 210. Pneumatic energy may be reciprocally converted with mechanical energy through a pump/compressor 211.

For an arrangement of such energy storage devices and energy transfer devices within a wind turbine system, communication may be provided between and among such devices. A system controller may be provided to control such energy transfer according to system conditions. A system controller may monitor the status and capacity of the energy storage and energy transfer devices. The system controller may be a part of the wind turbine controller or a separate control device may be provided. The system controller may receive inputs from a variety of sensors associated with the status and capacity of the energy storage and energy transfer devices. The system controller may also receive a plurality of status signals from the wind turbine, wherein the status signals may report the wind turbine operating conditions and any abnormalities in such operation. On sensing an operating wind turbine condition requiring energy be supplied from an energy storage device or other alternate energy source, the system controller may determine the appropriate source and take action to bring the alternate supply on line. Such response may include signaling the operation of pumps, motors, valves, actuators, switches and the like within the energy storage devices, energy transfer devices and energy sources. The system controller may continue to monitor the wind turbine to determine if the operating condition continues. The system controller may also continue to monitor the energy storage device or other alternate supply to determine its continued capability and capacity to provide the requisite backup. If the first energy storage device or alternate supply is exhausted the system controller may determine if another energy storage device or power supply may be available and then bring the another energy storage device or power supply on line. Further, after such event has been resolved, the system controller may replenish said energy storage device or alternate power supply.

Figure 6:
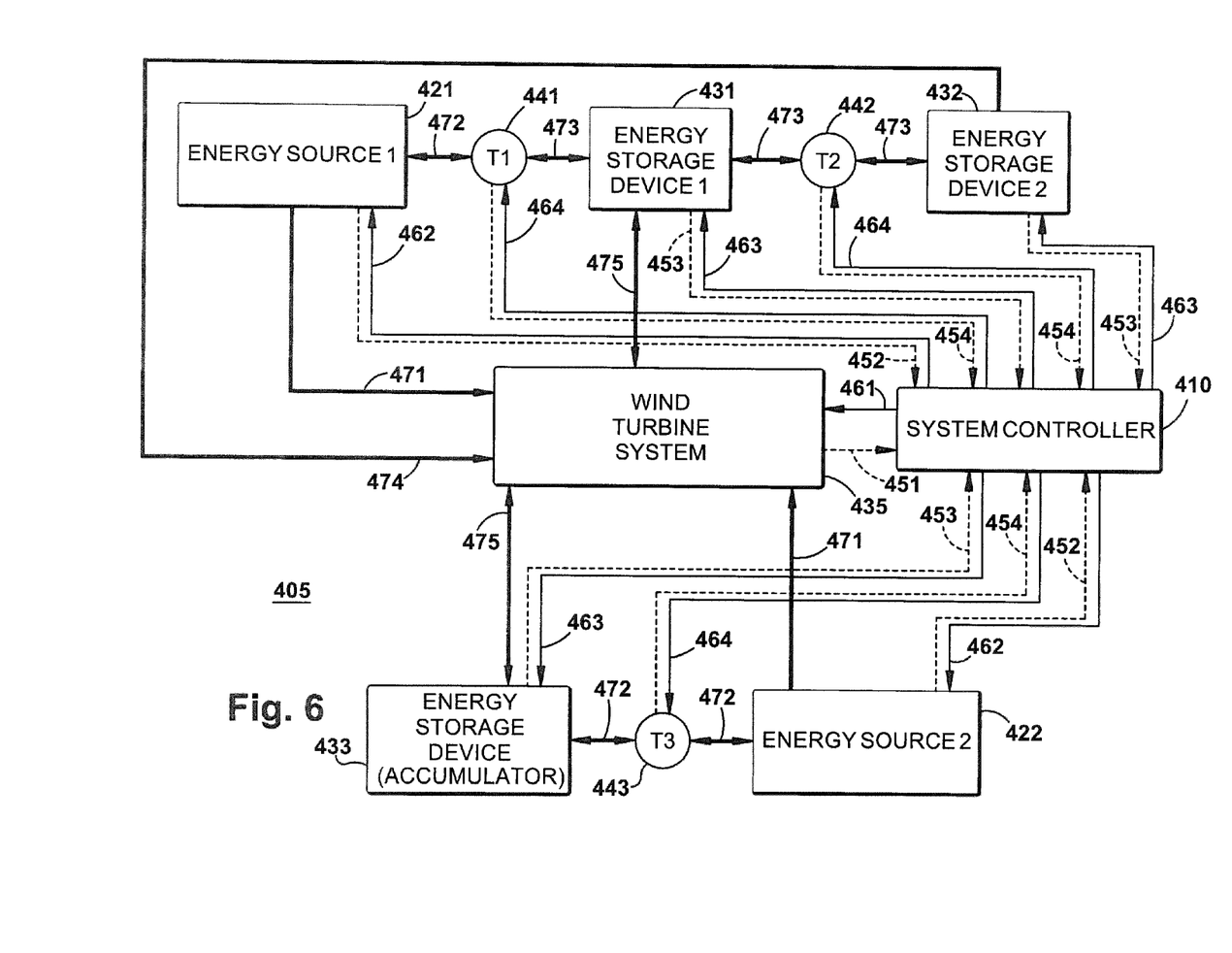
FIG. 6 illustrates an exemplary embodiment of an integrated system of communicating energy storages for a wind turbine system.

FIG. 6 illustrates an exemplary embodiment of an integrated system of communicating energy storages for a wind turbine system. The integrated system of communicating energy storages 405 may include system controller 410 and a wind turbine system 415. The system controller 410 may be part of a wind turbine controller (not shown) or may function in conjunction with the wind turbine controller. Alternatively, logic for control and transfer functionality may be built into individual storage and transfer devices. The wind turbine system 415 may be connected to a grid (not shown). Integrated system 405 may include a plurality of energy sources represented by energy source 1 421, and energy source 2 422, however the number of energy storage devices need not be limited to any particular number of devices. Integrated system 405 may further include a plurality of energy storage devices represented by storage device 1 431, storage device 2 432 and energy storage device 3 433, which may be an accumulator. However, the number of energy storage devices need not be limited to any particular number of devices. The energy storage devices 431, 432, 433 may be electrically connected to energy sources through one or more energy transfer devices represented by, but not limited to, transfer device 1 441, transfer device 2 442 and transfer device 3 443.

The system controller 410 may monitor an operating status of the wind turbine system 435 with a variety of known sensing devices and receive status signals 451. The system controller 410 may provide output control signals 461 to the wind turbine system 35, including operations related to the transfer of energy between and among the wind turbine system 415, the energy storage devices 431, 432, 433 and the energy sources 421, 422. The system controller 410 may further monitor the status and capacity of the wind turbine system 415 with a variety of known sensing devices and receive wind turbine system status signals 451.

The system controller 410 may monitor an operating status of the energy sources 421, 422 with a variety of known sensing devices and receive status signals 452. The system controller 410 may provide output control signals 462 to the energy sources 421, 422, including operations related to the transfer of energy between and among the wind turbine system 415, the energy storage devices 431, 432, 433 and the energy transfer devices 441, 442, 443. The system controller 410 may monitor an operating status of the energy storage devices 431, 432, 433 with a variety of known sensing devices and receive status signals 453. The system controller 410 may provide output control signals 463 to the energy storage devices 431, 432, 433 including operations related to the transfer of energy between and among the wind turbine system 410, the energy sources 421, 422 and the energy transfer devices 441, 442, 443. The system controller 410 may monitor an operating status of the energy transfer devices 441, 442, 443 with a variety of known sensing devices and receive status signals 454. The system controller 410 may provide output control signals 464 to the energy transfer devices 441, 442, 443 including operations related to the transfer of energy between and among the wind turbine system 410, the energy sources 421, 422 and the energy storage devices 431, 432, 433.

As described above, the integrated system 405 may provide control for flow of power 471 from energy sources 421, 422 to the wind turbine system 435, power flow 472 between energy sources and storage devices through energy transfer devices, power flow 473 between storage devices through energy transfer devices. The flow of power between an energy storage device 432 and the wind turbine system 415 may be uni-directional such as represented by power flow 474. Alternatively, the flow of power between other energy storage devices 431, 433 and the wind turbine system 415 may be bi-directional.

Figure 7:
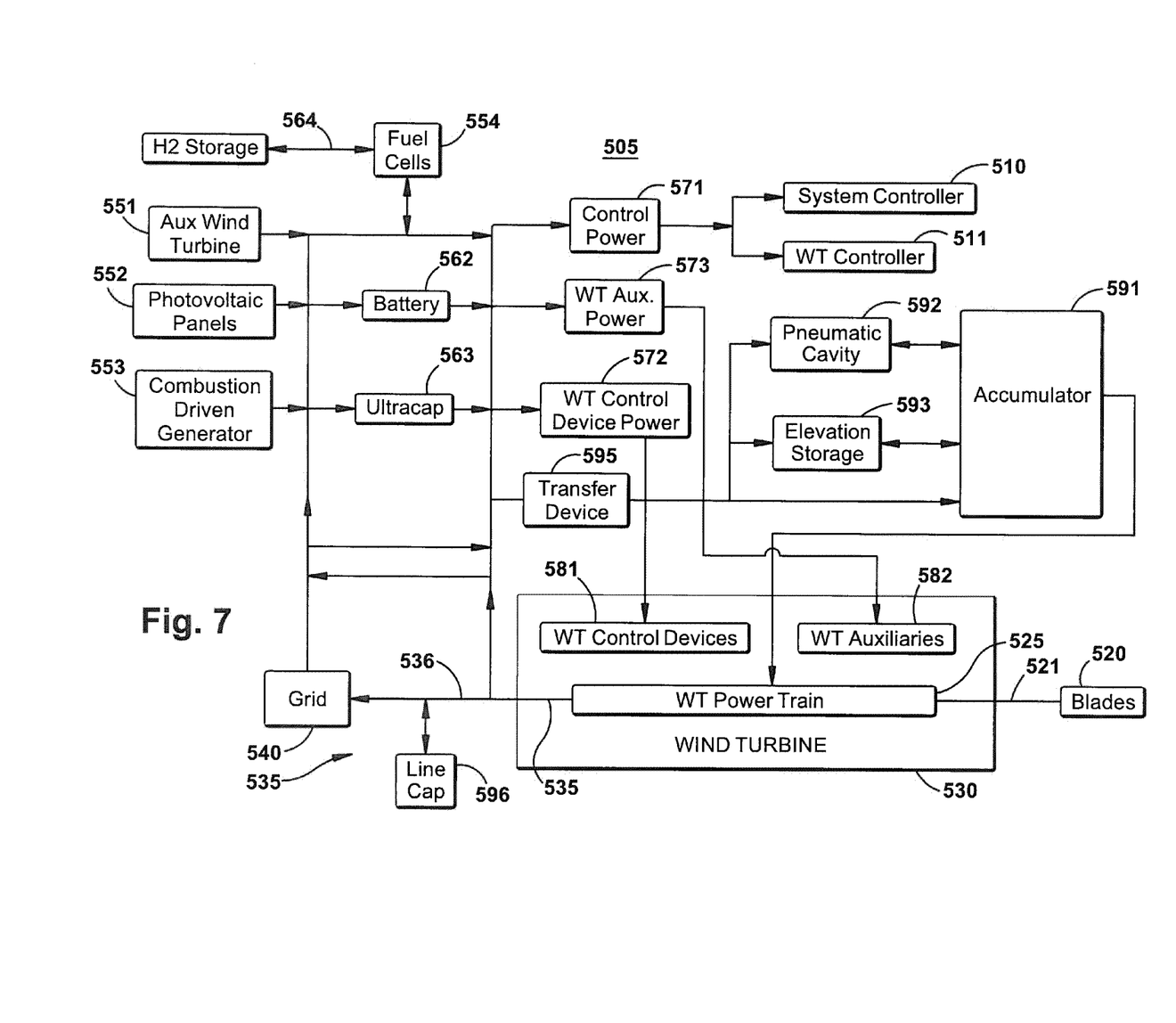
FIG. 7 illustrates a more detailed representation of an exemplary embodiment of the integrated system of communicating energy storages for a wind turbine system.

FIG. 7 illustrates, in greater detail, the integrated system 505 of communicating energy storages for a wind turbine system 535. Arrows within the system indicate available flows of energy between energy sources, energy storage, and system components utilizing the energy. Turbine blades 520 are operatively connected 521 to power train 525 of wind turbine 30. The power train 525 may include a main rotor shaft and gearbox coupled to an electrical generator (FIG. 2). The power train may also or alternatively include hydraulic coupling between the main rotor shaft and the generator (FIG. 4). Output 536 from the power train 525 may be connected through a series of known electrical devices of a windfarm (not shown) to an electrical grid 540. The integrated system 505 may further include a plurality of electrical supply sources that may uses to replenish one or more storage devices or energy using components. Such electrical supply sources may include an auxiliary wind turbine 551, photovoltaic cells 552 and combustion driven generator 553. The system may further include storage devices such as hydrogen banks 561 supplying fuel cells 554 as a further electrical power source.

Such a wind turbine system may further include capacitor bank storage devices between the wind turbine 530 and the grid 540. Such capacitor banks may be charged from the wind turbine electrical interconnection 536 with the grid 540 and may supply power during line transients.

Electrical power from the auxiliary wind turbine 551, the photovoltaic cells 552, the combustion driven generator 553 and the fuel cells 554 may be used to charge storage batteries 562 and capacitor banks 563. The hydrogen banks 561 may be recharged through the fuel cells 554. Further, power from the grid 540 or the wind turbine output 536 may be used to recharge the storage batteries 562, capacitor banks 563 and hydrogen storage 561.

Power to the wind turbine system may be generally categorized as control power 571, control device power 572, and auxiliary power 573. Control power 571 may be supplied to the system controller 510 and the wind turbine controller 511, as well as to the control logic, sensors and actuators for wind turbine control. Control device power 572 may be applied to control devices 581 associated with control of wind turbine operation. Such control devices 581 may include yaw motor, pitch motor, wind turbine ventilation, etc. Auxiliary power 573 may be supplied to support elements such as aviation lighting, tower lighting and other tower services.

The integrated system may also include an accumulator 591 coupled to the wind turbine power train 525. The accumulator 591 may either absorb excess power from or provide power to the wind turbine power train 525. Storage devices, such as pneumatic storage device 592 or elevation storage device may further be coupled with the wind turbine power train to replenish accumulator 591. Accumulator 591 may further be charged from transfer device 595, which may be powered from the aforementioned electric power sources or storage devices as symbolized in FIG. 5.

Figure 8:
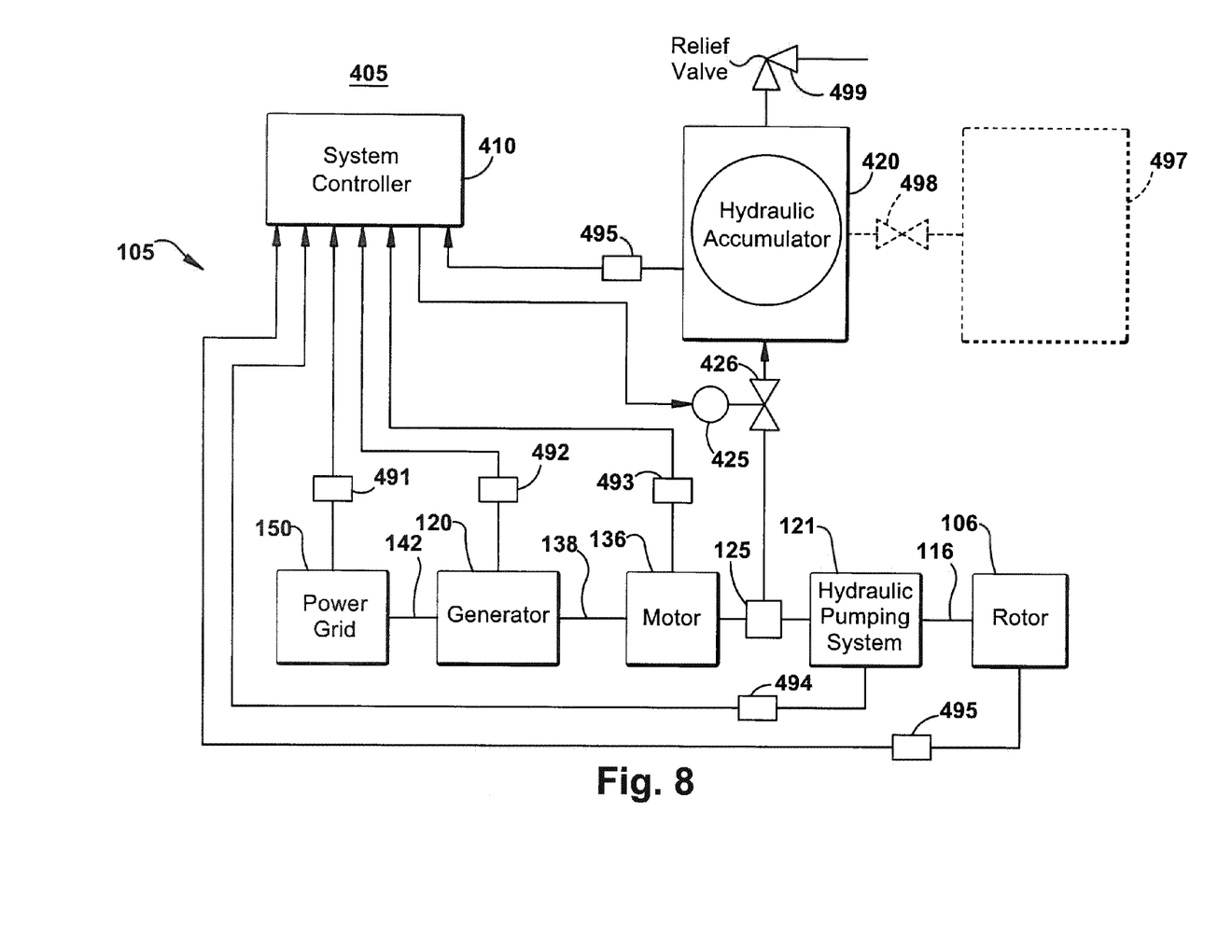
FIG. 8 illustrates a hydraulic accumulator adapted for assisting low voltage ride through in a main drive train with a hydraulic converter for a wind turbine.

FIG. 8 illustrates a hydraulic pumping system related to a wind power conversion in the main drive train for the wind turbine that includes a hydraulic accumulator to assist with low voltage ride through capability. Here, the hydraulic pumping system described in FIG. 4 may further include a hydraulic accumulator 420 sized to reduce irregularities of grid feed-in power by coupling the accumulator to the feed line (hydraulic fluid circulation system) 125 between the hydraulic pumping system 121 and the hydraulic motor 136.

An further embodiment of a system controller 410 for the integrated system of communicating energy storages 405 may receive system status inputs from sensor 491 on power grid 150, from sensor 492 on generator 140, from sensor 493 on the motor, from sensor 494 on hydraulic pumping system 121 and sensor 495 on rotor 106. Such inputs may be used for short-term fluctuation on the grid for less than about 1 second. In such a case, the controller 410 may sense such fluctuation from sensor 491 on generator 140, lineup the accumulator 420 to provide stabilizing input to the hydraulic motor 136 and control the response of the hydraulic accumulator 420 to stabilize fluctuations. As an example and not to be limited, such control may be exercised by controller 410 over actuator 425 for control device 426. It may further be recognized that hydraulic accumulator 420 may be tied to other energy storage devices/energy sources 497 that may be controlled 498 to replenish or sustain the hydraulic accumulator 420 as represented in FIG. 7.

In a further aspect of the present invention related to a hydraulic accumulator 420 providing an energy source or sink in relation to the hydraulic coupling 125 operatively connected between the rotor 106 and the generator 120, the hydrostatic pump valves may be actuated electrically. The electric operation for the pump valves may be is constructed in way that they open the valves when grid power is taken off, thereby lining up the pump to the hydraulic accumulator and relief valve so as to act as a braking system.

In the case of a short term grid disturbance of about 1 second to about 20 seconds, the accumulator may absorb energy from the rotor in cases where the grid no longer accepts power (e.g., as in the case of a voltage drop). As a result of filling, pressure in the accumulator 420 will rise from a pressure level during which the generator 150 was delivering power to the grid 150. The increase in pressure will help the wind turbine to control speed of the rotor 106. After reaching the pressure at which the pressure relief valve 499 lifts, the pressure in the accumulator 497 will remain relatively constant.

In such an arrangement, sensors 496 may monitor the capacity of the accumulator 420 in terms of pressure or other parameters representative of accumulator capacity. The sensor 496 may communicate such information to the system controller 410, which may be the wind turbine controller or a separate control device, wherein the system controller may make decisions with respect to continued operation of the wind turbine or shutdown of the wind turbine.

Sensors provided for other sources of power may provide availability and capacity information regarding the source to the controller (FIG. 6).

The system controller 410 may make decisions regarding which sources of power are available to meet a specific abnormal condition or a specific maintenance condition and order a response by a specific power source. For example in the situation where grid irregularities are encountered, the system controller 410 may assess the capacity of the hydraulic accumulator 420 and control the hydraulic accumulator to provide appropriate hydraulic power to the hydraulic motor to smooth said irregularities on the grid.

Figure 9:
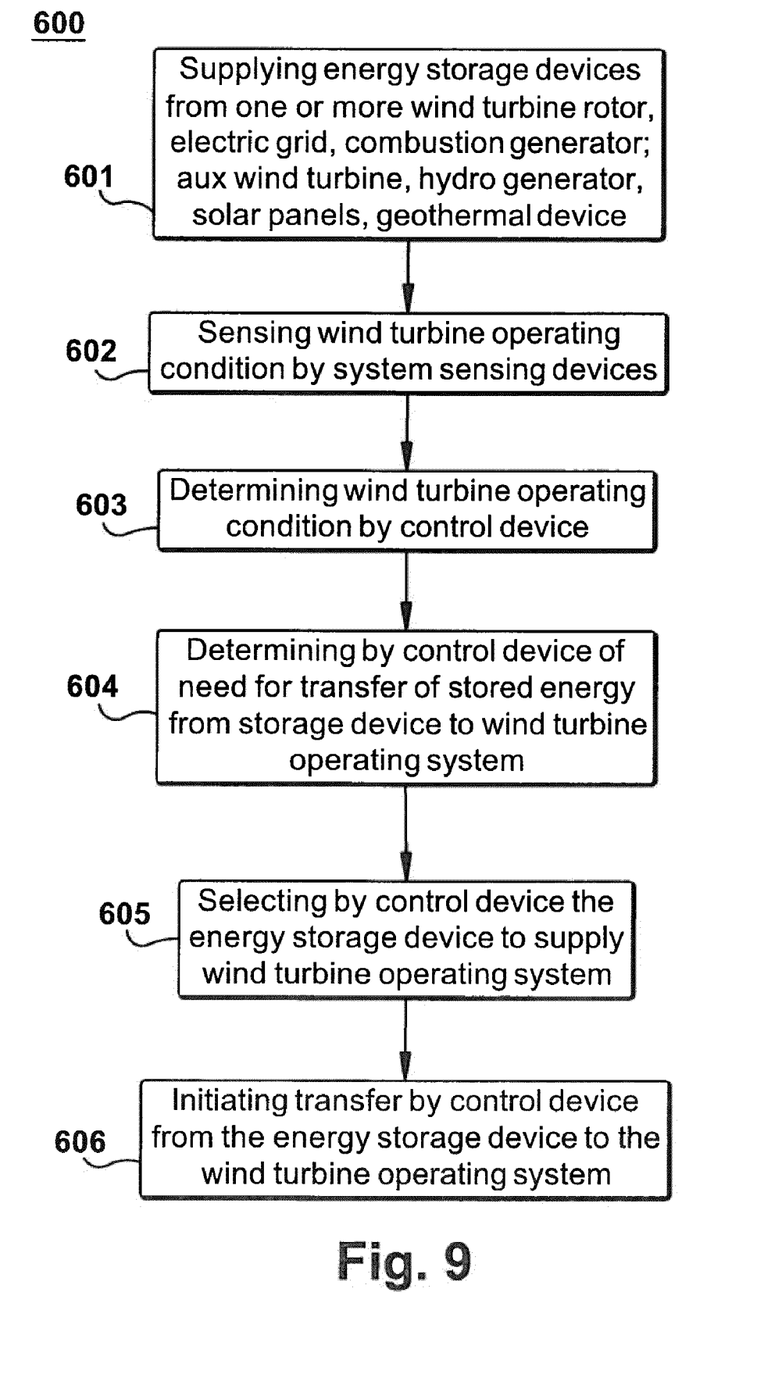
FIG. 9 illustrates a method for supplying wind turbine systems from a system of communicating energy storages.

In more extended loss of grid power for greater than about 20 seconds, the energy stored in accumulators and other energy storage devices may provide for a safe shutdown of the wind turbine system with continued operation of control devices and auxiliary systems. FIG. 7 illustrated a plurality of energy sources, storage devices and energy transfer devices that could provide power to wind turbine controllers, wind turbine control devices, and to wind turbine auxiliary systems, as illustrated in FIG. 9. The wind turbine controller 511 and system controller 510 (if separate from the wind turbine controller) may be supplied from control power 571. Other controllers being supplied from control power 571 may include a pitch controller, yaw controller, a brake controller. Control devices powered from wind turbine control device power may include sensors such as temperature sensors, and actuators for pitch control, yaw control, and cooling. For hydraulic yaw systems, yaw power may be provided from hydraulic accumulators such as 420 in FIG. 8. Other wind turbine auxiliaries such as tower and internal lighting may be supplied from auxiliary supply 573. The energy level in the various electrical system may be maintained by self-filling powering means such as solar panels 552, combustion engines 553, fuel cells 554 or an auxiliary wind turbine 551 or by systems that need external supply, as illustrated in FIG. 8.

In many maintenance states, electric power produced by the wind turbine is not available to allow necessary operations related to positioning and control of the wind turbine components. Such operations may include moving the rotor into any required position; turning the generator to any required position; turning the blade to any required position; turning the nacelle in any require position; and actuating the brake (primary or secondary) and locks. In order to maintain energy in the system during non-power generating periods, one or more of the energy storage devices and accumulators may be utilized to provide power for such functions. In these maintenance states the energy storage devices and accumulators may need to be manually turned on and off or otherwise be regulated to recognize the requirements for maintenance or to preserve the stored energy for later use.

In a further embodiment of the present invention, a method for operating an integrated system of communicating energy storage devices is provided. The integrated system is adapted for supplying an alternate power source to operating systems for a wind turbine connected to an electrical grid. The alternate power sources may include at least one wind turbine connected to an electrical grid; at least one operating system of the at least one wind turbine requiring an alternate power source during a wind turbine operating condition; a plurality of energy storage devices capable of supplying the alternate power source; communication of energy storage between at least two of the plurality of energy storage devices; and a control device for controlling the transfer of energy between the energy storage devices and at least one wind turbine system.

FIG. 9 illustrates an embodiment of the present inventive method 600 for operating an integrated system of communicating energy storage devices. Step 601 supplies the energy storage devices from at least one of a rotor of the wind turbine, the electric grid, an auxiliary wind turbine attached; a hydroelectric generator; solar panels, and geothermal electric generation. In step 602, system sensing devices sense a wind turbine operating condition. In step 603, a control device determines the wind turbine operating condition. In step 604, the control device determines the need for transfer of stored energy between a stored energy device and a wind turbine operating system for the wind turbine operating condition. The control device, in step 605, selects which of the plurality of energy storage devices may provide for the transfer of energy to the wind turbine operating system for the wind turbine operating condition. In step 606, the control device initiates a transfer of stored energy between a stored energy device and a wind turbine operating system for the wind turbine operating condition.

Further aspects of the method for operating an integrated system of communicating energy storages may include activating a hydraulic converter in a main drive train for the wind turbine. Here the accumulator coupled to a feed line between a motor and a pump, wherein the wind turbine operating condition is normal wind turbine operation accompanied by irregularities of grid feed-in power of about less than 1 second duration, causing the hydraulic accumulator to supplying power to the grid to reduce the irregularities. In a circumstance where the wind turbine operating condition is a short-term grid disturbance of about 1 second to about 20 seconds duration in which the grid no longer accepts power from the wind turbine, a further response may be activating a hydraulic accumulator in the wind turbine power train for converting the excess power from the wind turbine to pressure accumulation in the hydraulic accumulator so as to absorb energy from a rotor of the wind turbine. A further step may include activating a relief valve on the hydraulic accumulator to absorb excess energy from the rotor.

For more extended loss of grid power for greater than about 20 seconds, the method may include activating at least one energy storage device to supply power to a plurality of sensors for monitoring wind turbine operation for a wind turbine operating condition of a loss of grid power for an extended period of greater than about 20 seconds; activating a hydraulic converter, to supply a hydraulic yaw system; activating electrically a hydraulic converter pump to provide power for at least one of a plurality of actuators for wind turbine control and a plurality of controllers for wind turbine control, wherein the actuators and controllers fail in a mode to permit the accumulator to brake the wind turbine; activating energy storage devices for supplying a plurality of auxiliary circuits, including a internal lighting, and aviation lighting; and activating a hydraulic accumulator, wherein plurality of operational activities required for a wind turbine operating condition is of a maintenance state and wherein the at least one of the plurality of energy accumulators provides an energy source for at least one of the plurality of moving the rotor into any required position; turning the generator in any required position; turning the nacelle in any required position; actuating primary and secondary locks and primary and secondary brakes.

While various embodiments are described herein, it will be appreciated from the specification that various combinations of elements, variations or improvements therein may be made, and are within the scope of the invention.

The invention claimed is:

1. An integrated system of communicating energy storage devices for supplying an alternate power source to operating systems for a wind turbine connected to an electrical grid, the integrated system comprising:
   at least one wind turbine with a rotor, the wind turbine being connected to an electrical grid;
   at least one operating system of the at least one wind turbine requiting an alternate power source during a wind turbine operating condition;
   a plurality of energy storage devices capable of supplying the alternate power source; and
   communication of energy storage between at least two of the plurality of energy storage devices, wherein
   the plurality of energy storage devices comprising: at least two energy storage devices, capable of supplying the alternate energy power source, being selected from a group consisting of a pneumatic accumulator, an electrical energy accumulator, a mechanical accumulator; and a chemical energy accumulator.

2. The integrated system of communicating energy storage devices according to claim 1, wherein the electrical energy accumulator comprises: at least one of capacitors, inductors, and superconducting coils.

3. The integrated system of communicating energy storage devices according to claim 1, wherein the pneumatic energy accumulator comprises: at least one of an air-filled accumulator, a gas-filled accumulator, and a hydraulic accumulator.

4. The integrated system of communicating energy storage devices according to claim 1, wherein the mechanical energy accumulator comprises: at least one of a spring device and an elevation device.

5. The integrated system of communicating energy storage devices according to claim 1, wherein the chemical energy accumulator comprises: at least one of a battery and a hydrogen storage.

6. The integrated system of communicating energy storage devices according to claim 1, communication of energy storage between at least two of the plurality of energy storage devices further comprising at least one of:
   a converter providing a flow of energy between the electrical energy accumulator and the mechanical accumulator including at least one of an electrical motor and an electrical generator;
   a converter providing a flow of energy between the electrical energy accumulator and the pneumatic accumulator including at least one of an electrical motor and a hydraulic pump;
   a converter providing a flow of energy between the electrical energy accumulator and the chemical energy accumulator including at least a one of a fuel cell, electrolysis device and a battery;
   a converter providing flow of energy between the chemical energy accumulator and the mechanical energy accumulator including at least one of combustors and combustion engines; and
   a converter providing a flow of energy between the pneumatic accumulator and the mechanical accumulator including at least one of a hydraulic pump, a hydraulic motor, and a hydraulic actuator.

7. The integrated system of communicating energy storage devices according to claim 1, wherein the integrated system of communicating energy storage devices further provides communication with at least one of a rotor of the wind turbine, the electric grid, an auxiliary wind turbine attached; a hydroelectric generator; solar panels, and geothermal electric generation.

8. The integrated system of communicating energy storage devices according to claim 1, further comprising:
   a hydraulic converter operatively connected between a rotor and a generator in a main drive train of the wind turbine;
   a hydraulic accumulator operatively coupled to the hydraulic converter, wherein when the wind turbine operating condition is normal wind turbine operation accompanied by short term irregularities of less than about 1 second duration for grid feed-in power, the hydraulic accumulator supplies power to the hydraulic accumulator, driving the generator to reduce the irregularities in the grid.

9. The integrated system of communicating energy storage devices according to claim 6, further comprising:
   a hydraulic converter operatively connected between a rotor and a generator in a main drive train of the wind turbine;
   a hydraulic accumulator operatively coupled to the hydraulic converter;
   a pressure relief valve operatively connected to the hydraulic accumulator;
   wherein the wind turbine operating condition is a short-term grid disturbance of about 1 second to about 20 seconds duration in which the grid accepts less than the full output from the wind turbine, the excess power from the wind turbine is converted to pressure accumulation in the hydraulic accumulator.

10. The integrated system of communicating energy storage devices according to claim 9, wherein the pressure relief valve opens to stop further pressure buildup in the accumulator while absorbing energy from the wind turbine.

11. The integrated system of communicating energy storage devices according to claim 6, further comprising:
    a yaw system; and
    a hydraulic accumulator,
    wherein the wind turbine operating condition is loss of grid power for an extended period of greater than about 20 seconds, wherein the hydraulic accumulator communicates energy to supply the yaw system.

12. The integrated system of communicating energy storage devices according to claim 6, further comprising:
    a plurality of sensors, wherein at least one of the plurality of energy accumulators provides electric power to at least one of the plurality of sensors, wherein the wind turbine operating condition is a loss of grid power for an extended period of greater than about 20 seconds.

13. The integrated system of communicating energy storage devices according to claim 6, further comprising:
    a plurality of controllers including a turbine main controller, a pitch controller, and brake controller, wherein the at least one of the plurality of energy accumulators provides an energy source for at least one of the plurality of controllers, and wherein the wind turbine operating condition is a loss of grid power for an extended period of greater than about 20 seconds.

14. The integrated system of communicating energy storage devices according to claim 6, further comprising:
    a plurality of actuators, including a yaw actuator, a pitch actuator, a brake actuator, and a brake actuator, wherein the at least one of the plurality of energy accumulators provides an energy source for at least one of the plurality of controllers, and wherein the wind turbine operating condition is a loss of grid power for an extended period of greater than about 20 seconds.

15. The integrated system of communicating energy storage devices according to claim 6, further comprising:
   a hydrostatic converter pump being electrically activated;
   a plurality of actuators for wind turbine control;
   a plurality of controllers for wind turbine control; and
   wherein during a loss of grid power for an extended period of greater than about 20 seconds, the actuators and controllers fail in a mode to permit the accumulator to brake the wind turbine.

16. The integrated system of communicating energy storage devices according to claim 6, further comprising:
   a plurality of lighting circuits, including a internal lighting, and aviation lighting, wherein the at least one of the plurality of energy accumulators provides an electrical for at least one of the plurality of lighting circuits, and wherein the wind turbine operating condition is a loss of grid power for an extended period of greater than about 20 seconds.

17. The integrated system of communicating energy storage devices according to claim 6, further comprising:
   a plurality of operational activities required for a wind turbine operating condition is of a maintenance state, wherein the at least one of the plurality of energy accumulators provides an energy source for at least one of the plurality of moving the rotor into any required position; turning the generator in any required position; turning the nacelle in any required position; actuating primary and secondary locks and primary and secondary brakes.

18. An integrated system of communicating energy storage devices for supplying an alternate power source to operating systems for a wind turbine connected to an electrical grid, the integrated system comprising:
   at least one wind turbine connected to an electrical grid;
   at least one operating system of the at least one wind turbine requiring an alternate power source during a wind turbine operating condition;
   a plurality of energy storage devices capable of supplying the alternate power source, the plurality of energy storage devices including at least two energy storage devices, capable of supplying the alternate energy power source, being selected from a group consisting of a pneumatic accumulator, an electrical energy accumulator, a mechanical accumulator; and a chemical energy accumulator;
   communication of energy storage between at least two of the plurality of energy storage devices; and
   a controller adapted for controlling the transfer of energy between the energy storage devices and at least one wind turbine system, wherein the controller determines a need of at least one system of the at least one wind turbine for an alternate power source, assesses the capability of the plurality of energy storage devices and selects the energy storage device to supply the alternate power, and initiates and controls transfer of energy to the system wind turbine system requiring the alternate power.

* * * * *